UNITED STATES PATENT OFFICE.

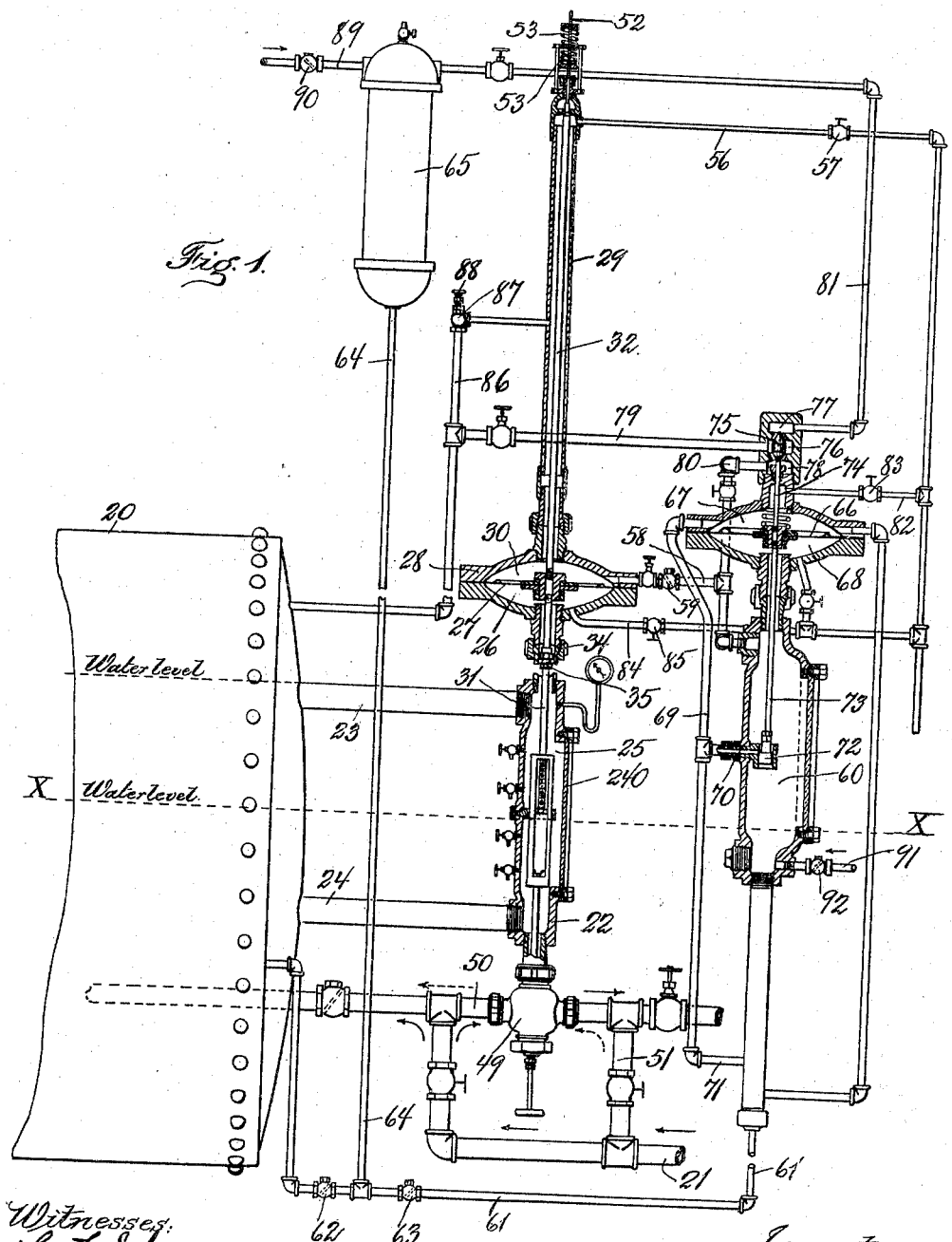

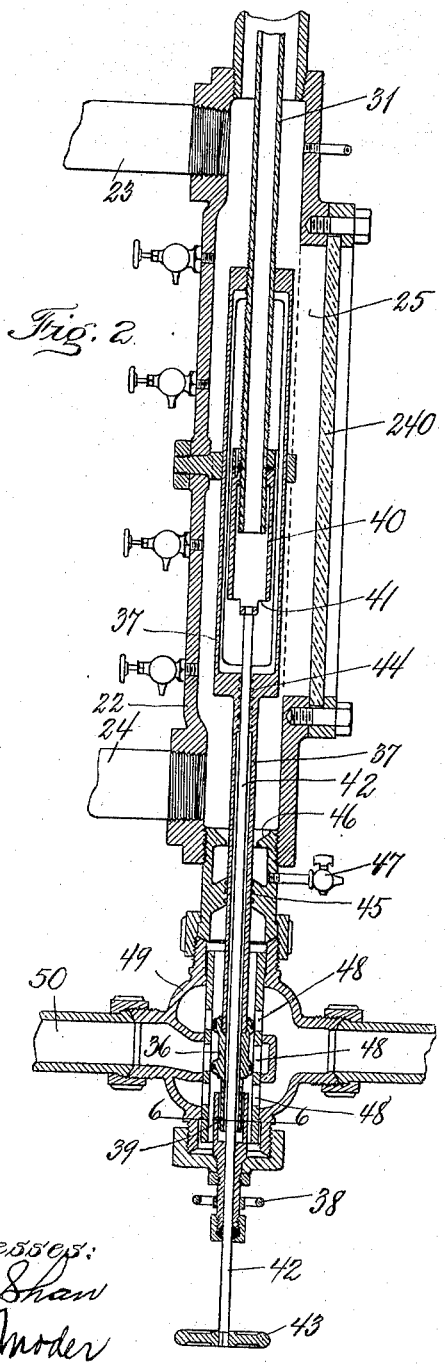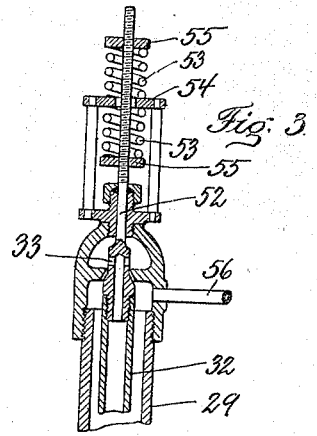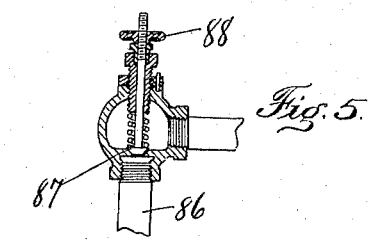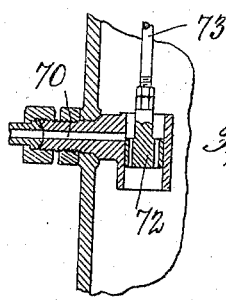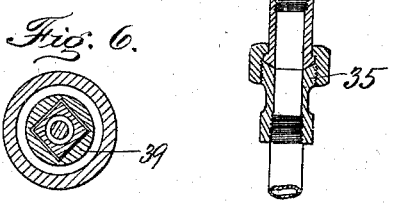

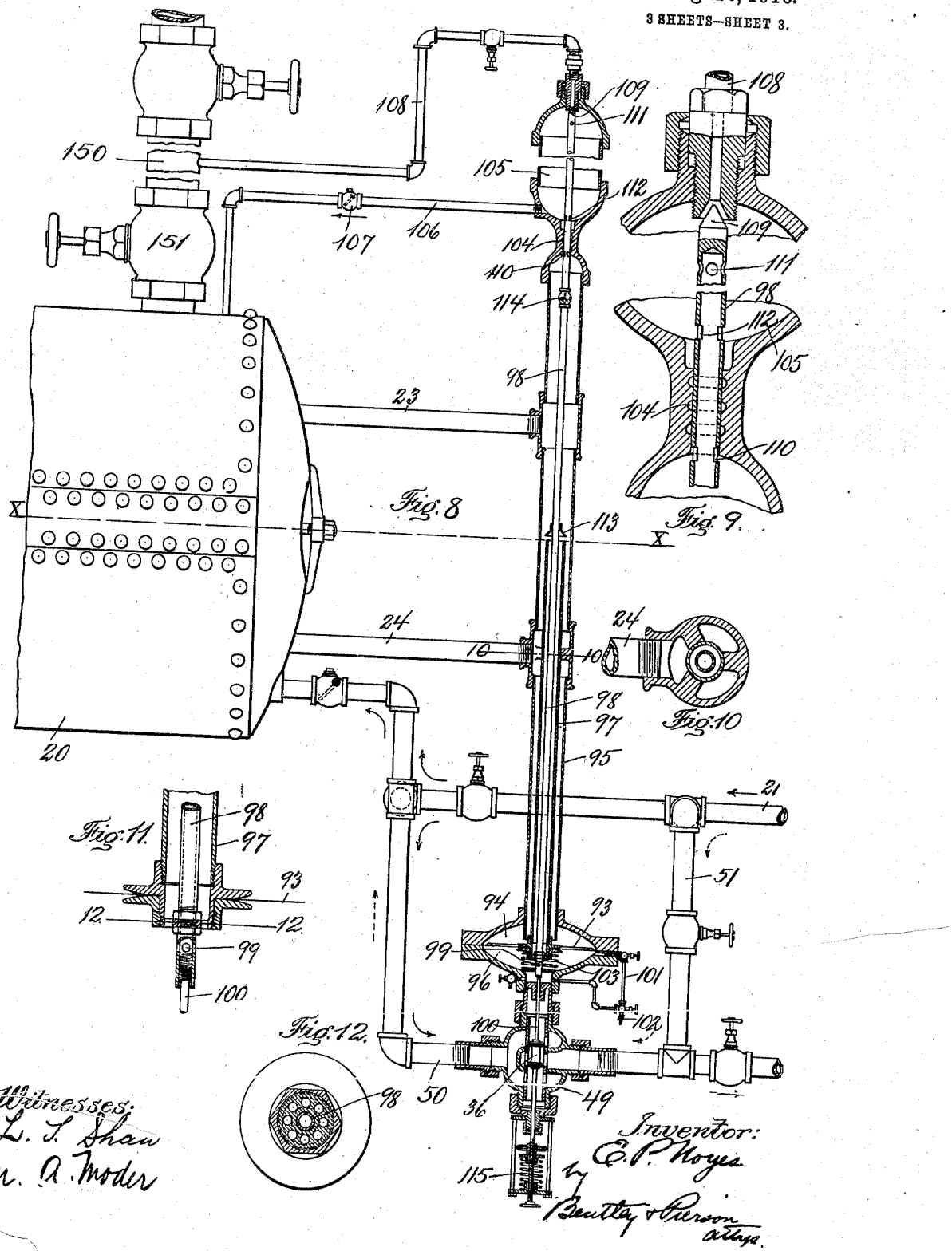

EDWARD P. NOYES, OF WINCHESTER, MASSACHUSETTS, ASSIGNOR TO C. P. POWER COMPANY, OF NEWARK, NEW JERSEY, A CORPORATION OF NEW JERSEY.

WATER-LEVEL CONTROLLER.

967,228.            Specification of Letters Patent.     Patented Aug. 16, 1910.

Application filed October 14, 1905. Serial No. 282,717.

*To all whom it may concern:*

Be it known that I, EDWARD P. NOYES, a citizen of the United States, residing at Winchester, in the county of Middlesex and State of Massachusetts, have invented certain new and useful Improvements in Water-Level Controllers, of which the following specification and accompanying drawings illustrate the invention in a form which I now regard as the best out of the various forms in which it may be embodied.

This invention relates to liquid-level controllers and especially those embodying a diaphragm or similar device operated by differences in fluid-pressure caused by shifting of the liquid-level and serving to control the flow of liquid to or its exit from a pressure-vessel or to perform other useful functions with respect to said vessel.

Among the objects accomplished by the invention are the provision of means for returning to the boiler or other vessel water which has entered the controller in consequence of its operation, provisions for varying the normal water-level, for reversing the operation of the controller, and for more readily adjusting the controller and assembling and removing its parts.

Of the accompanying drawings, Figure 1 represents a diagrammatic sectional view of water-level controlling apparatus embodying my invention but with certain parts omitted for the sake of clearness. Fig. 2 represents an enlarged section of part of the main controller with the aforesaid parts in place, Fig. 3 represents a section of the upper end of the main controller, Fig. 4, represents a section of a diaphragm-operated valve in the secondary controller, Fig. 5 represents a section of a valve in the primary controller, Fig. 6 represents a section on the line 6—6 of Fig. 2, Fig. 7 represents a sectional view of the coupling in the dip-tube of the main controller, Fig. 8 represents a sectional diagrammatic view showing a modification, Fig. 9 represents a section of the upper part of the modified controller, Fig. 10 represents a section on the line 10—10 of Fig. 8, Fig. 11 represents an enlarged section of the diaphragm and connections in the modified controller, Fig. 12 represents a section on the line 12—12 of Fig. 11.

The same reference characters represent the same parts in all the figures.

In the drawings, 20 is a pressure-vessel which may be assumed to be a steam boiler supplied with water through a feed-pipe 21 from a pump, and 22 is a water-column or casing connected with the boiler by means of pipes 23 24 above and below the normal water line X—X so that the water level stands the same as in the boiler except at the alternative high-level hereinafter described. Column 22 has a glass wall 240 for observing its interior at the water line. The interior chamber 25 of the water-column connects with a chamber 26 on the lower side of a diaphragm 27 mounted in a diaphragm-casing 28 above which the controller-casing has the tubular extension 29 whose interior communicates with the upper diaphragm-chamber 30. Attached to the diaphragm is a dip-tube 31 whose lower orifice is at the intended water-line, the said dip-tube having an extension 32 extending a considerable distance above the diaphragm within the casing 29 and having outlets 33 into the interior of casing 29. The depression of diaphragm-casing 28 to a comparatively low level which this construction affords enables said casing to be more firmly supported than if it were at the top of the dip-tube and yet does not curtail the length of the dip-tube, on which depends the height of water-column sustained and the amount of differential pressure exerted on the diaphragm as hereinafter more fully explained. It will be noted that the controller-casing and dip-tube below the diaphragm-casing 28 are provided with unions or couplings 34 35 respectively at about the same level, enabling the controller to be disjointed at this point.

Diaphragm 27 operates a balanced feed-valve 36 with which it is connected by a hollow stem 37 forming an extension of the dip-tube and threaded on said tube so that by rotation of stem 37, effected by an externally-exposed hand-wheel 38 having a telescopic squared connection 39 with the stem, the distance between the feed-valve and the diaphragm may be regulated and said valve adjusted with respect to its ports. The part of valve-stem 37 surrounding the inlet to the dip-tube is of open or skeleton construction and enlarged to receive a sleeve 40 screwing on the lower end of the upper section of the dip-tube and forming the immediate inlet to said tube at its lower lip 41. A rod 42 connected with this sleeve and having an external hand-wheel 43 and an hydraulic packing 44 in the hollow stem 37 enables sleeve 40 to be adjusted up and down to raise and lower the inlet of the dip-tube with respect to the diaphragm and thus vary the normal water level. By the described construction the adjustment of the distance of the feed-valve from the diaphragm and the length of the dip-tube are independently performed. It is further to be noted that this is done by means of endwise adjustments.

Valve-stem 37 passes through an hydraulic packing partition 45 which separates the boiler-water from the feed-water and is upwardly coned on both its upper and lower faces. Above this partition is a downwardly-coned guide 46, in the chamber below which sediment may be collected and blown out through a cock 47. The upward coning of the partition on its lower face 45 and the downward coning of guide 46 enable the valve-stem 37 and the sleeve stem 42 to readily find their apertures in said partition on being assembled. The upward coning of the upward face of partition 45 sheds sediment away from the bearing in said partition and the orifice in 46 around 37 directs any down-flow into the bearing and washes it.

It will be seen that the ports 48 in the feed-valve cylinder are unsymmetrical with respect to the median horizontal axis of the valve-casing 49 and that the coupling threads on the upper and lower ends of the cylinder are similar. This enables the valve casing to be turned end for end about said axis, whereupon if the position of the valve 36 be not changed, the movement of said valve will act oppositely on the ports, that is, where formerly an upward movement of the valve opened these ports as shown in Fig. 2, it will now close them and vice versa. This enables the valve to act either as a direct-feed throttle or as a by-pass. In the drawing it is shown connected to act as a by-pass, since a rising water-level resulting in elevation of the diaphragm as hereinafter described calls for less water and opens a by-pass through conduit 50 past the valve 36. A cross-conduit 51 is shown connecting the feed-pipe 21 with the by-pass 50 whereby upon manipulation of the appropriate stop-valves, the feed-water may initially pass the valve 36 and be throttled by its upward movement.

The upper end of the dip-tube 32 is continued in a stem 52 which passes through the top of the controller-casing and is engaged by two oppositely-acting springs 53 53 interposed between a stationary yoke 54 and two adjusting nuts 55 on the said stem, these springs serving to dampen the motion of the diaphragm, which but for the presence of some such damping means would have a tendency to a gratuitous reciprocating movement of slight amplitude which would be detrimental to a steady throttling or by-pass action.

It will be understood that when the water-line reaches and covers the lower end of dip-tube 31 the steam-space of the boiler will be shut off from upper diaphragm-chamber 30 and the pressure will be reduced therein by condensation and leakage through a small pipe 56 having a slightly-opened leakage-valve 57 connecting with some locality of lower pressure. The steam-pressure underneath the diaphragm then predominates and pushes said diaphragm upwardly, causing a diminution or cessation of supply of feed-water to the boiler until evaporation has depressed the water level and uncovered the dip-tube. Water rises in the dip-tube 31 32 to a height which is a measure of the differential pressure acting on the diaphragm and when the level sinks below the dip-tube this column tends to fall back into the chamber 25 or to be blown over into the upper diaphragm-chamber 30. To prevent the accumulation of a deep column of water on top of the diaphragm, which would tend to counteract the differential upward pressure, I provide the outlet pipe 58 containing check-valve 59 and opening into a secondary controller for conserving the water driven up through the dip-tube, and returning it to the boiler. This secondary controller includes a reservoir chamber 60 partly above and partly below the water-line, connecting by a return-pipe 61 with the water-space of boiler 20. At 62 63 in said pipe are two check-valves opening toward the boiler and between these valves a branch pipe 64 leads to an elevated condensation-chamber 65. The secondary controller further includes the differential diaphragm 66, and upper and lower diaphragm-chambers 67 68 operating on the same principle as the corresponding parts in the other controller. The lower diaphragm-chamber 68 is in connection with the steam-space of reservoir-chamber 60 while the upper diaphragm-chamber connects by a pipe 69 with chamber 60 at two points 70 71 at different heights. The branch inlet 70 is controlled by a piston-valve 72 connected by a stem 73 with the diaphragm 66.

Above the diaphragm a stem 74 connects with a double-acting valve 75 controlling communication between a middle chamber 76 and upper and lower chambers 77 78. The middle chamber receives live steam from the boiler through a pipe 79. The lower chamber 78 connects by a pipe 80 with the upper space of reservoir-chamber 60. The upper chamber 77 connects by a pipe 81 with the upper space of condensation-chamber 65. 82 is a leakage-pipe leading from the upper diaphragm-chamber 67 and containing leakage-valve 83.

Further connections comprise a leakage-pipe 84 leading from the lower diaphragm-chamber 26 of the primary controller and containing a leakage-valve 85; a branch pipe 86 extending from the steam space of the boiler to the upper casing 29 of the primary controller and containing a spring-loaded valve 87 (shown in detail in Fig. 5) adapted on occasion to be held in open position by a nut 88; a feed-water pipe 89 entering the condensation-chamber 65 and containing a check-valve 90; and another feed-water pipe 91 entering the reservoir-chamber 60 of the secondary controller and containing a check-valve 92.

The operation of the secondary controller is as follows. It may be supposed for the moment that before chamber 60 is filled the dip-tube 31 has been uncovered, whereupon upper diaphragm-chamber 30 and chamber 60 receive the initial steam pressure and any water-accumulation in chamber 30 will flow into chamber 60 through pipe 58 down to the normal water-level. This is the simplest function of the chamber 60 and to its performance only the return connections 58 60 61 are necessary. However, the capactiy of these connections for temporary storage would usually be somewhat limited and as the dip-tube 31 under certain conditions of operation might not be uncovered promptly, the further functions of the secondary controller are called into use. When water-level in the chamber 60 has reached passage 70 it seals the upper diaphragm-chamber 67, leakage through pipe 82 reduces the pressure in said chamber and diaphragm 66 rises, closing valve 72 and moving valve 75 away from its lower seat and against its upper seat. This admits boiler pressure through pipes 79 and 80 into the upper part of chamber 60 and the water in the latter chamber is forced out down to the level of inlet 71. The closing of valve 75 against its upper seat has shut off steam pressure from the upper part of condensation-chamber 65 and thereupon condensation occurs in said chamber and the water from chamber 60 is forced around through pipes 61 and 64 into the chamber 65. Since there is no pressure present superior to the boiler-pressure, gravity could not empty chamber 60 below the water-line of the boiler but the vacuum in chamber 65 enables chamber 60 to be emptied and the water to be raised above the water-line level. As soon as inlet 71 is uncovered, pressures are balanced on opposite sides of the diaphragm 66 and the latter descends, opening valve 72 and moving valve 75 away from its upper seat and against its lower seat. This shuts off the boiler pressure from the upper part of chamber 60 and admits it to the upper part of the condensation chamber 65, whereupon the water accumulated in the latter and in pipe 64 falls by gravity to the water-line level, check-valve 62 permitting its entrance into the boiler and check-valve 63 preventing its return to chamber 60. The secondary controller therefore acts in effect as a trap for the withdrawal of water from the diaphragm chamber 30 and the expulsion of said water, and the condensation-chamber 65 in connection with said controller operates to return the expelled water to the boiler. Thereby the action of the controller 27, 49, etc., is much accelerated.

Means practically equivalent to the passages 58, 60, 61 for returning water, from a controller chamber such as 30, by gravity to the boiler, is described and claimed in my Patent No. 832,620, but the invention just described herein differs in the employment of a trap independent of the level controller for expelling said water, and the addition of means such as the condensation chamber 65 operating for the purpose set forth.

The described mechanism may be employed to introduce other bodies of water to the boiler as for example introducing water from the pipes 89 or 91, though I do not claim broadly the mere combination of a drain trap and elevated condensation chamber for introducing water to a boiler.

The loaded valve 87 is present for the purpose of preventing an excessive difference of pressure between the upper and lower diaphragm-chambers in the primary controller. Should the difference become greater than the pressure for which said valve is set the valve will automatically open and admit boiler steam into the casing 29. Valve 87 also performs another function in that in combination with the release-pipe 84 it enables the operation of the controller 28 to be reversed and a quick alteration of the standard water-level attained, for upon closing tight the valve 57 in release-pipe 56, opening release-valve 85 slightly, and drawing valve 87 away from its seat by means of the nut 88, the upper diaphragm-chamber 30 will constantly receive boiler pressure while the lower diaphragm-chamber 26 will be subject to the water-level in the boiler when the latter reaches and covers pipe 23. Therefore by the mere adjustment of connections the normal water-level may be quickly raised as is desirable in some instances, for example, when leaving the boiler for the night. When such reversal is made a suitable readjustment in the connections of the feed-valve 36 should be effected in order that a downward movement of the diaphragm 27 caused by the rising water-level should decrease the supply of feed-water either by closing a feed-throttle or opening a feed by-pass.

In Figs. 8 to 12, inclusive, I have shown my invention applied to a somewhat different form of differential level-controller. In this case a diaphragm 93 is located a considerable distance below the normal water-line X—X and operated by the difference in weight of two columns of water acting on opposite sides of said diaphragm. In the upper diaphragm-chamber 94 a water-column of substantially constant height is maintained through the cylindrical casing 95 forming an upward extension of said chamber and connecting by pipes 23 24 with the boiler 20 above and below the water-line. The lower diaphragm-chamber 96 connects with the water-line level by means of an upwardly-extending tube 97 within the casing 95. Inside of said tube is a small pipe 98 connecting at its lower end with the diaphragm 93 and having inlets 99 in the lower diaphragm-chamber, below which is an extension or stem 100 connecting with the feed-valve 36 which has connections similar to those shown in Fig. 1 and bearing like reference-characters. 101 is a gage-glass for observing the conditions within the lower diaphragm-chamber and 102 is a cock for blowing off said chamber. 103 is a spring below the diaphragm which normally tends to elevate the latter. Pipe 98 is upwardly extended through a water-packed partition 104 into a condensation-chamber 105 located above the water-line in the boiler and having its lower end connected with the steam-space of the boiler by pipe 106 containing a check-valve 107. A second pipe 108 connects the upper end of this chamber with the exit passage from the steam-space of the boiler. In first starting, it is essential that all air shall be blown out from chamber 105 and its connections. Pipe 108 permits this, the large stop-valve 151 next the boiler on the main steam-line 150 being slightly throttled for this, if necessary. Passage 108 is controlled by a valve 109 formed on the upper end of pipe 98, and also by the stop-valve shown in pipe 108. Pipe 98 has an opening into the upper part of casing 95 through apertures 110 adapted to be shut off by moving within the partition 104, and in the condensation chamber 105 said pipe has openings 111 112 in both the upper and lower parts of the chamber. Just above the inlet of tube 97 the pipe 98 carries a canopy baffle 113 which prevents the entrance into said tube of any water which may leak through partition 104. In the pipe 98 is a check-valve 114 opening upwardly. The operation of this modification is as follows: So long as water-level is below the line X—X the lower diaphragm-chamber stands substantially empty and the downward pressure of the water-column in the upper diaphragm-chamber 94 overcomes the upward pressure of springs 103 115. When the water reaches the upper end of tube 97 it overflows into the lower diaphragm-chamber and establishes a column of water which eventually balances the downwardly-pressing column and allows the springs 103 115 to raise the diaphragm 93 and valve 36, to diminish the supply of feed-water. This upward movement of the diaphragm also closes the ports 110 and shuts off the supply of steam pressure to the condensation-chamber 105. Condensation thereupon occurs in said chamber and the water in the lower diaphragm-chamber 96 flows up through pipe 98 to fill this vacuum, entering said chamber through the ports 111 and 112. The downwardly-pressing water-column then depresses diaphragm 93 and the condensation-chamber 105 is again opened to boiler steam-pressure through the ports 110 and 111, whereupon the water in said chamber descends by gravity to the boiler through pipe 106. When pipe 106 is in use the pipe 108 may be closed by its stop-valve and occasionally opened to prevent the chamber 105 getting air-bound. Pipe 108 may also be normally left open and used for admitting the steam to condensation-chamber 105 when the diaphragm is down and shutting it off therefrom by means of valve 109 when the diaphragm is up, in which event the ports 112 110 may effect the return of the water into the boiler by way of casing 95, check-valve 114 preventing any down flow inside pipe 98.

What I claim as new and desire to secure by Letters Patent is:

1. The combination of a vessel adapted to contain a liquid and an elastic fluid under pressure, a controller for said vessel having a septum operated by differences of pressure, means subject to a varying liquid-level for causing said pressure differences, a chamber in said controller receiving a portion of the liquid whose level varies, and liquid-level-controlled mechanism for automatically returning the liquid from said chamber to the vessel.

2. The combination of a vessel adapted to contain a liquid and an elastic fluid under pressure, a controller subject to the liquid level in said vessel and having means for abstracting liquid from said vessel and elevating it above the normal liquid line, a return connection whereby the abstracted liquid is re-introduced to the vessel, and means for preventing a back-flow of the liquid in said return connection.

3. The combination of a steam boiler, an automatic feed regulator controlled by the water-level in said boiler and having means for abstracting boiler water, means for draining said controller to a point at or below the boiler water line to accelerate its action, and automatic return-trap mechanism for re-introducing the drainage water to the boiler.

4. The combination of a controller having a liquid-collecting chamber and including a differential septum and means subject to a varying liquid level for controlling the effective pressure on said septum, a drainage-chamber to receive the collected liquid, a condensation-chamber connected with said drainage-chamber, and means controlled by the liquid-level in said drainage-chamber for controlling steam admission to said condensation-chamber.

5. The combination of a steam boiler, a controller operated by differences of pressure caused by variation of the water-level in said boiler and adapted to abstract a portion of the boiler-water, a drainage-chamber to receive the abstracted water, an elevated condensation-chamber for receiving the drainage and returning it by gravity to the boiler, a connection for admitting steam-pressure to said drainage-chamber, and means controlled by the water-level in said drainage-chamber for opening and closing said connection.

6. The combination of a pressure-vessel adapted to contain a liquid, a diaphragm having a chamber on one side thereof subject to the constant pressure of said vessel and a water-receiving chamber on the opposite side whose pressure is varied by the liquid level in the vessel, a gravity-chamber for returning the water from the last-said diaphragm chamber to the vessel, and means controlled by the level of the accumulated water from said diaphragm-chamber for automatically introducing said water to said gravity-chamber.

7. The combination of a vessel adapted to contain a liquid and an elastic fluid under pressure, a differential controller for performing a useful function with respect to said vessel and having a differential member and a variable-pressure chamber, an inlet to said chamber subject to the liquid-level in the vessel for admitting the elastic fluid to said chamber, a safety connection between said chamber and the elastic-fluid space of the vessel, and a loaded valve in said connection opening toward said chamber.

8. The combination of a controller having a differential member, chambers on opposite sides of said member, connections for admitting a constant pressure to both of said chambers, connections for varying the pressure in both of said chambers by means of a variable liquid level whereby the controller may be reversed, and means for opening and closing one of said constant-pressure connections.

9. The combination of a pressure-vessel adapted to contain a liquid, a member operated by the difference between opposed pressures, means subject to variation in the liquid-level for controlling said pressure difference, and connections for causing the pressure difference to act in either direction on said member, whereby the operation of the controller may be reversd.

10. The combination of a pressure-vessel adapted to contain a liquid and an elastic fluid under pressure, a differential member having pressure chambers on opposite sides with liquid-level-controlled inlets from said vessel at different heights for producing a differential pressure, and means for reversing the direction of the differential pressure.

11. The combination of a pressure-vessel adapted to contain a liquid, a movable device controlled by the liquid-level, a feed-valve actuated by said device, and a reversible valve-casing having ports adapted to be either opened or closed by the same movement of the valve according to the position of said casing.

12. The combination of a pressure-vessel adapted to contain a liquid, a feed-valve automatically controlled by the liquid-level, a direct-feed connection and a by-pass connection, both controlled by said valve, and means whereby the feed-liquid is caused to pass through either connection at will.

13. The combination of a differential member adapted to be controlled by liquid-level, a casing having chambers on opposite sides of said member, a tube carried by said member and forming an inlet to one of the chambers, and separable couplings in the casing and in said tube located in substantially the same zone.

14. The combination of a differential member adapted to be controlled by liquid-level, a casing having chambers on opposite sides of said member, a tube carried by said member and forming an inlet to one of the chambers, subject to the liquid level, and means for adjusting the distance of the inlet opening of said tube from the differential member to vary the normal liquid-level.

15. The combination of a differential member adapted to be controlled by liquid-level, a casing having chambers on opposite sides of said member, a tube carried by said member and forming an inlet to one of the chambers, subject to the liquid level, a valve attached to the differential member, and means for varying the position of the inlet opening of said tube without varying the distance of said valve from the diaphragm.

16. A differential member having pressure-chambers on opposite sides thereof, a dip-tube carried by said member and having an inlet adjustable toward and away therefrom, a valve connected with said member and adjustable toward and away therefrom, and externally-exposed means for performing each of said adjustments independently of the other.

17. The combination of a controller-casing having a differential member with pressure-chambers on opposite sides thereof, a dip-tube carried by said member, a valve provided with a hollow stem screwing on said dip-tube and having means exposed outside of the casing for rotating the stem, a sleeve carrying the inlet of the dip-tube and screwing on said tube, and a stem projecting from said sleeve through the hollow valve-stem to the exterior of the casing.

18. The combination of the differential member having pressure-chambers on opposite sides thereof, one of which is provided with an inlet at an intended liquid-level, a valve connected with said member for controlling a liquid-feed, and opposed springs connected with said member for damping the movement thereof.

19. The combination of a differential member, a casing carrying the same and having a valve-chamber and a chamber adapted to be connected with a pressure-vessel, a partition separating said chambers, a rod separably connected with said member and traversing said partition, and means for automatically centering said rod in said partition by the end-thrust of the rod in assembling the same with said differential member.

In testimony whereof I have hereunto set my hand in the presence of two subscribing witnesses, the first day of September 1905.

EDWARD P. NOYES.

Witnesses:
MARCUS B. MAY,
A. W. HARRISON.